US009434429B2

(12) United States Patent
Mizusawa

(10) Patent No.: US 9,434,429 B2
(45) Date of Patent: Sep. 6, 2016

(54) RUBBER CRAWLER

(71) Applicant: BRIDGESTONE CORPORATION, Chuo-ku, Tokyo (JP)

(72) Inventor: Takashi Mizusawa, Yokohama (JP)

(73) Assignee: BRIDESTONE CORPORATION, Tokyo (JP)

( * ) Notice: Subject to any disclaimer, the term of this patent is extended or adjusted under 35 U.S.C. 154(b) by 0 days.

(21) Appl. No.: 14/403,276

(22) PCT Filed: May 16, 2013

(86) PCT No.: PCT/JP2013/063682
§ 371 (c)(1),
(2) Date: Nov. 24, 2014

(87) PCT Pub. No.: WO2013/176035
PCT Pub. Date: Nov. 28, 2013

(65) Prior Publication Data
US 2015/0097419 A1  Apr. 9, 2015

(30) Foreign Application Priority Data

May 25, 2012 (JP) ................. 2012-119778

(51) Int. Cl.
B62D 55/24 (2006.01)
(52) U.S. Cl.
CPC .......... *B62D 55/244* (2013.01); *B62D 55/242* (2013.01)
(58) Field of Classification Search
CPC  B62D 55/242; B62D 55/244; B62D 55/253; B62D 55/24; B62D 55/18
USPC ............... 305/165, 166, 167, 170, 171, 172
See application file for complete search history.

(56) References Cited

U.S. PATENT DOCUMENTS 3,212,627 A * 10/1965 Beebee ............... B29D 29/00
198/847
4,595,388 A * 6/1986 Tangorra ............ F16G 1/28
474/202

(Continued)

FOREIGN PATENT DOCUMENTS

JP 2562202 Y2 2/1998
JP 2001-10555 A 1/2001
JP 2001-18863 A 1/2001

OTHER PUBLICATIONS

International Search Report of PCT/JP2013/063682 dated Aug. 20, 2013.

(Continued)

*Primary Examiner* — John Walters
(74) *Attorney, Agent, or Firm* — Sughrue Mion, PLLC

(57) ABSTRACT

A rubber crawler includes a rubber belt, a main cord layer that is incorporated within the rubber belt and includes a main cord extending around the crawler circumferential direction, a bias cord layer that is incorporated further to the crawler circumferential outside than the main cord layer and is configured from bias cords extending at an angle with respect to the crawler circumferential direction, a bias cord layer that is interposed between the bias cord layer and the main cord layer, and is configured from bias cords extending at an angle with respect to the crawler circumferential direction so as to intersect the first bias cords, and a reinforcement cord layer that is interposed between the bias cord layer and the bias cord layer, and is configured from reinforcement cords extending in the crawler width direction.

3 Claims, 8 Drawing Sheets

(56) References Cited

U.S. PATENT DOCUMENTS

| | | | | |
|---|---|---|---|---|
| 6,742,852 B2 * | 6/2004 | Tsuru | ................... | B62D 55/244 305/165 |
| 7,083,242 B2 * | 8/2006 | Piou | ..................... | B62D 55/244 305/166 |
| 7,128,378 B2 * | 10/2006 | Sugihara | .............. | B62D 55/253 305/166 |
| 7,823,988 B2 * | 11/2010 | Song | ................... | B62D 55/244 305/167 |
| 2004/0235600 A1 | 11/2004 | Piou et al. | | |
| 2009/0079260 A1 | 3/2009 | Song | | |

OTHER PUBLICATIONS

Communication dated Oct. 13, 2015, issued by the Japan Patent Office in corresponding Japanese Application No. 2012-119778.

\* cited by examiner

RUBBER CRAWLER

CROSS REFERENCE TO RELATED APPLICATIONS

This is a National Stage of International Application No. PCT/JP2013/063682 filed May 16, 2013, claiming priority based on Japanese Patent Application No. 2012-119778 filed May 25, 2012, the contents of all of which are incorporated herein by reference in their entirety.

TECHNICAL FIELD

The present invention relates to a rubber crawler.

BACKGROUND ART

Generally steel cord layers acting as tensile bodies are internally incorporated in rubber crawlers. From the perspective of durability, such steel cord layers normally have a structure of a single rubber covered steel cord wound in a spiral shape.

However, in spiral structure steel cord layers, the steel cord extends at an angle with respect to the crawler circumferential direction, such that shear deformation occurs in response to tension in the crawler circumferential direction due to anisotropic elasticity of the steel cord layer.

The rubber crawler, trained between the wheels of a machine body under a specific tension, is affected by the shear deformation of the steel cord layer and deforms, resulting in slippage in the crawler width direction (referred to below as "lateral slippage" where appropriate) as the crawler revolves (circulates) between the wheels on which it is trained.

Frequently encountered approaches to suppress lateral slippage of the rubber crawler include adjusting the attachment of the wheels (wheel alignment), providing the rubber crawler with guide projections that guide the rotation direction of the wheels, providing a bias ply that undergoes shear deformation in a direction to cancel out the shear deformation of the steel cord layer, and the like.

In a rubber crawler described in Japanese Utility Model Gazette (JP-Y) No. 2562202, a bias cord layer (bias ply) including a bias cord extending at an angle with respect to the crawler circumferential direction is provided at the crawler circumferential outside of a steel cord layer. Shear deformation of the bias cord layer cancels out shear deformation of the steel cord layer, suppressing lateral slippage during travel.

SUMMARY OF INVENTION

Technical Problem

Generally in rubber crawlers (including that of JP-Y No. 2562202), bias cord layers are provided in dual-layer sets, in which bias cords in a first layer bias cord layer and bias cords in a second layer bias cord layer are angled at the same angle in mutually opposing directions with respect to the crawler circumferential direction (a center line of the rubber crawler). Shear deformation of the first layer bias cord layer and shear deformation of the second layer bias cord layer mutually cancel each other out.

However, in bias cord layers configuring dual-layer sets, when the rubber crawler is trained around wheels, greater tension arises in the bias cord layer positioned on the crawler circumferential outside than in the bias cord layer positioned on the crawler circumferential inside. It is therefore difficult to completely mutually cancel out shear deformation in bias cord layers configured as dual-layer sets.

An object of the present invention is to suppress deformation of each internally incorporated cord layer, and to suppress lateral slippage of a rubber crawler during travel.

Solution to Problem

A rubber crawler of a first aspect of the present invention includes: an endless rubber body that is trained around plural wheels; a main cord layer that is incorporated within the rubber body and includes a main cord extending around a rubber body circumferential direction; a first bias cord layer that is incorporated within a rubber body further to the rubber body circumferential outside than the main cord layer and is configured from first bias cords arranged side-by-side around the rubber body circumferential direction, the first bias cords extending at an angle with respect to the rubber body circumferential direction; a second bias cord layer that is interposed between the first bias cord layer and the main cord layer, and is configured from second bias cords arranged side-by-side around the rubber body circumferential direction and extending at an angle with respect to the rubber body circumferential direction so as to intersect the first bias cords; and a reinforcement cord layer that is interposed between the first bias cord layer and the second bias cord layer, and is configured from reinforcement cords extending in a rubber body width direction, the reinforcement cords arranged side-by-side around the rubber body circumferential direction.

Advantageous Effects of Invention

As described above, the rubber crawler of the present invention is capable of suppressing deformation of each internally provided cord layer, and of suppressing lateral slippage during travel.

DESCRIPTION OF EMBODIMENTS

First Exemplary Embodiment

Explanation follows regarding a rubber crawler according to a first exemplary embodiment of the present invention, with reference to FIG. 1 to FIG. 5.

An endless rubber crawler 10 according to the first exemplary embodiment is what is referred to as a metal-core-less type rubber crawler that does not have a metal core.

Figure 1:
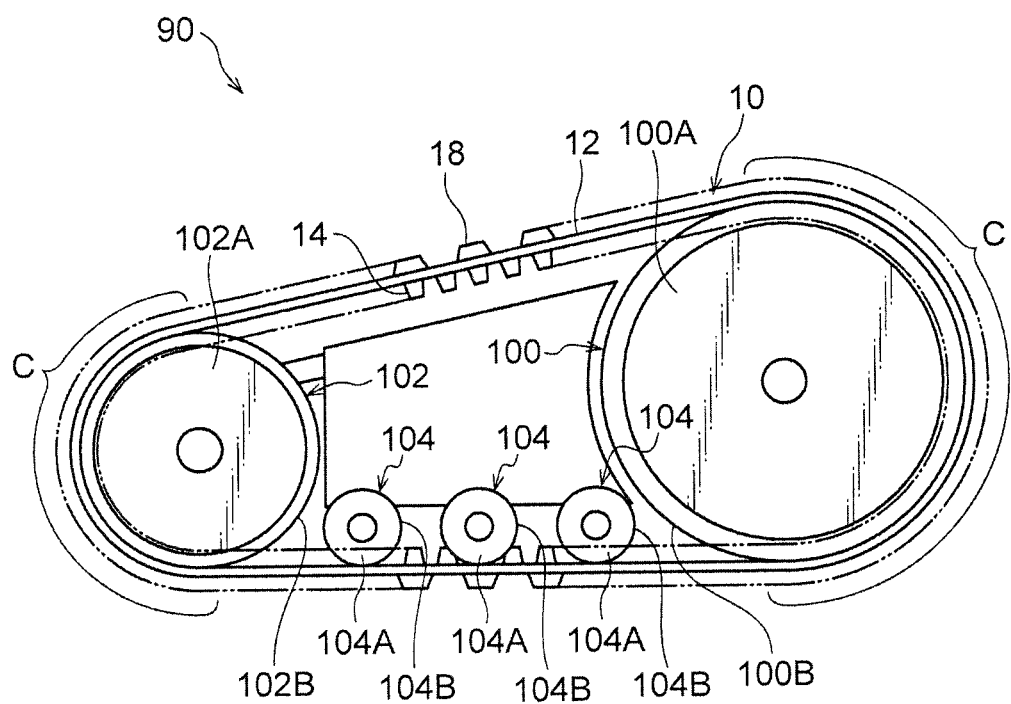
FIG. 1 is a side view of a rubber crawler of a first exemplary embodiment, as viewed along the crawler width direction.

As illustrated in FIG. 1, the rubber crawler 10 is employed trained around a drive wheel 100 coupled to a drive shaft of a tracked vehicle, serving as a machine body, and an idler wheel 102 rotatably attached to the tracked vehicle. At the inner periphery of the rubber crawler 10, plural rollers 104 are disposed between the drive wheel 100 and the idler wheel 102 and rotatably attached to the tracked vehicle so as to rotate. The drive wheel 100, the idler wheel 102, and the rollers 104 are each examples of wheels of the present invention In the present exemplary embodiment, the circumferential direction of the endless rubber crawler 10 (the arrow S direction in FIG. 3) is referred to as the "crawler circumferential direction", and the width direction of the rubber crawler 10 (the arrow W direction in FIG. 3) is referred to as the "crawler width direction". The crawler circumferential direction and the crawler width direction are orthogonal to one another as viewed from the circumferential outside or the circumferential inside of the rubber crawler 10.

In the present exemplary embodiment, the circumferential inside (the arrow IN direction side in FIG. 3) of the rubber crawler 10 trained in a ring shape (encompassing circular ring shapes, elliptical ring shapes, and polygonal ring shapes) around the drive wheel 100 and the idler wheel 102 is referred to as the "crawler circumferential inside", and the circumferential outside of the rubber crawler 10 (the arrow OUT direction side in FIG. 3) is referred to as the "crawler circumferential outside". The arrow IN direction (ring shape inside direction) and the arrow OUT direction (ring shape outside direction) in FIG. 3 indicate the inward and outward directions of the rubber crawler 10 in a trained state.

In the present exemplary embodiment, the rubber crawler 10 is configured trained around the drive wheel 100 and the idler wheel 102; however the present invention is not limited thereto, and depending on the placement of the drive wheel 100, the idler wheel 102, and the plural rollers 104, the rubber crawler 10 may be configured trained around one or more of the plural rollers 104 in addition to the drive wheel 100 and the idler wheel 102.

The drive wheel 100, the idler wheel 102, the rollers 104, and the rubber crawler 10 trained thereon configure a crawler traveling device 90 (see FIG. 1) of the first exemplary embodiment, serving as a traveling section of the tracked vehicle.

As illustrated in FIG. 1, the drive wheel 100 includes a pair of circular plate shaped wheel portions 100A coupled to the drive shaft of the tracked vehicle. Outer circumferential faces 100B of the wheel portions 100A contact and rotate wheel-rotated faces 16 of the rubber crawler 10, described later. The drive wheel 100 imparts drive force of the tracked vehicle to the rubber crawler 10 (detailed explanation of which follows later), circulating the rubber crawler 10 between the drive wheel 100 and the idler wheel 102.

The idler wheel 102 includes a pair of circular plate shaped wheel portions 102A rotatably attached to the tracked vehicle. Outer circumferential faces 102B of the wheel portions 102A contact the wheel-rotated faces 16 of the rubber crawler 10, described later. A pressing mechanism, for example a hydraulic pressing mechanism, not illustrated in the drawings, is provided on the tracked vehicle side to push the idler wheel 102 in a direction away from the drive wheel 100, and press the idler wheel 102 against the wheel-rotated faces 16 of the rubber crawler 10 so as to maintain tension (tensile force) in the rubber crawler 10.

The rollers 104 support the weight of the tracked vehicle, and include circular plate shaped wheel portions 104A rotatably attached to the tracked vehicle. Outer circumferential faces 104B of the wheel portions 104A contact the wheel-rotated faces 16 of the rubber crawler 10, described later.

The idler wheel 102 and the rollers 104 rotate following the rubber crawler 10 circulating between the drive wheel 100 and the idler wheel 102.

Figure 2:
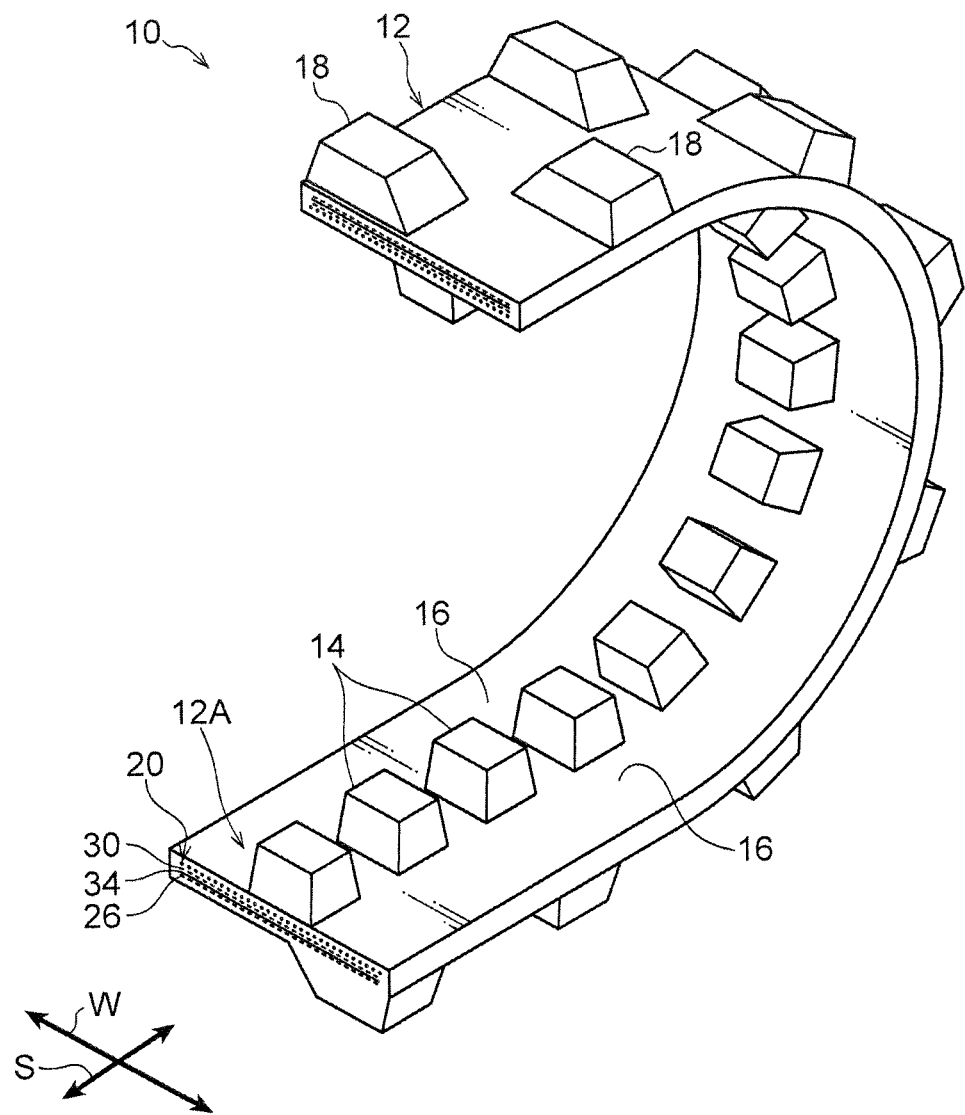
FIG. 2 is a perspective view, including a partial cross-section, of a rubber crawler of the first exemplary embodiment.

As illustrated in FIG. 1 and FIG. 2, the rubber crawler 10 includes a rubber belt 12, formed from rubber in an endless belt shape. The rubber belt 12 of the present exemplary embodiment is an example of an endless rubber body of the present invention. The circumferential direction (rubber body circumferential direction), width direction (rubber body width direction), circumferential inside (rubber body circumferential inside), and circumferential outside (rubber body circumferential outside) of the rubber belt 12 of the present exemplary embodiment respectively correspond to the crawler circumferential direction, the crawler width direction, the crawler circumferential inside, and the crawler circumferential outside.

As illustrated in FIG. 1 and FIG. 2, an inner circumferential face 12A of the rubber belt 12 is formed with plural rubber projections 14 that project out toward the crawler circumferential inside at intervals around the crawler circumferential direction. The rubber projections 14 are disposed at a crawler width direction central portion of the rubber belt 12, and limit movement of the wheels in the crawler width direction by contacting the wheels rotating at the wheel-rotated faces 16, described later. In other words, the rubber projections 14 contact the wheels, thereby suppressing relative displacement between the rubber crawler 10 and the wheels in the crawler width direction, namely suppressing lateral slippage of the rubber crawler 10 with respect to the wheels.

Figure 3:
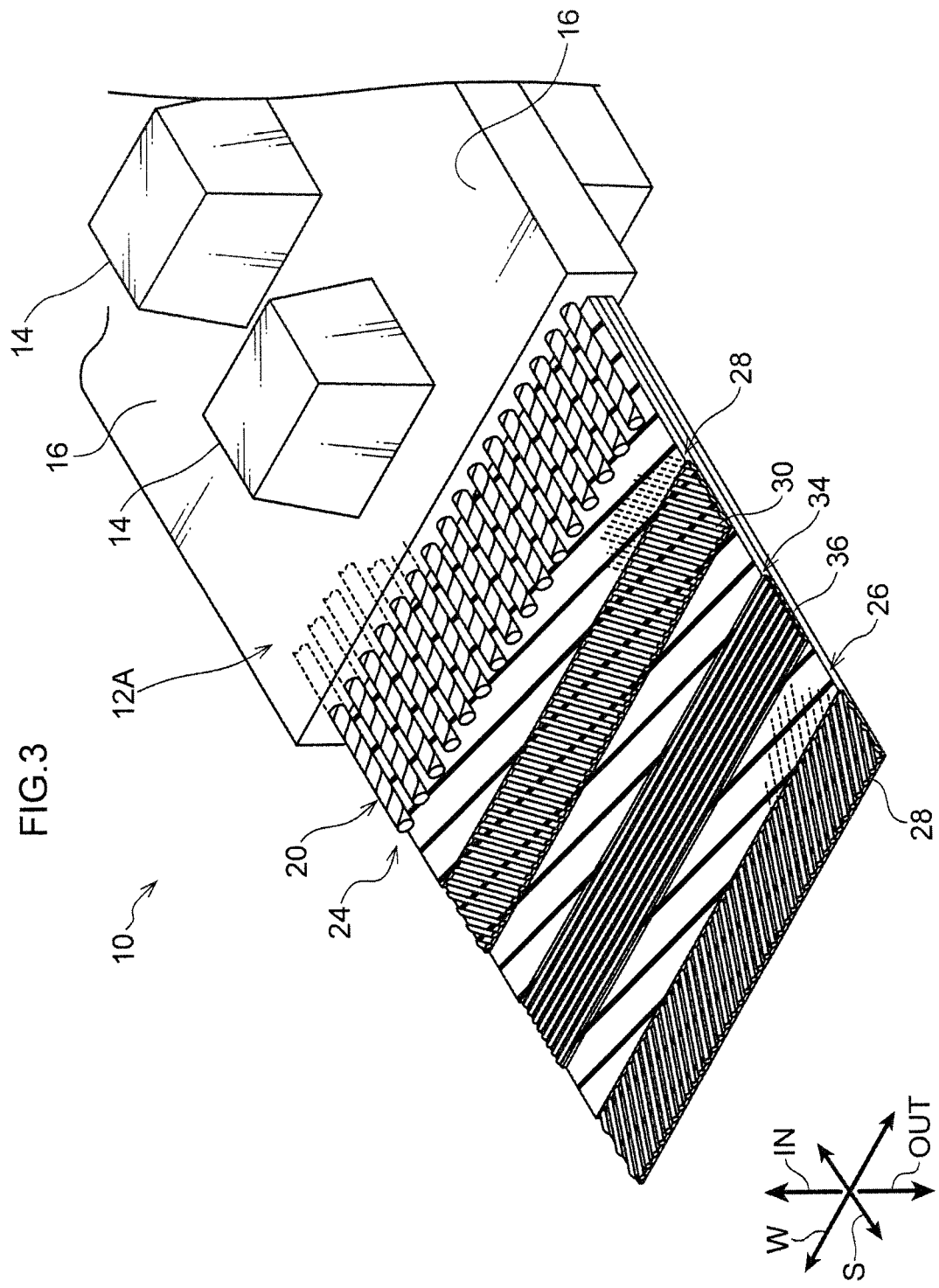
FIG. 3 is a perspective view, including a partial cross-section, of respective cord layers of the first exemplary embodiment.

As illustrated in FIG. 2 and FIG. 3, the wheel-rotated faces 16 are respectively formed extending around the crawler circumferential direction of the rubber belt 12 on both crawler width direction sides of the rubber projections 14. The wheel-rotated faces 16 are each configured with a flat profile, and configure a portion of the inner circumferential face 12A of the rubber belt 12. Note that in the present exemplary embodiment, faces on the inner circumferential face 12A of the rubber belt 12 between the rubber projections 14 are configured in the same plane (namely at the same height) as the wheel-rotated faces 16, however the present invention is not limited thereto, and the wheel-rotated faces 16 may be raised further toward the crawler circumferential inside than the faces between the rubber projections.

In the present exemplary embodiment, the drive wheel 100, the idler wheel 102, and the rollers 104 rotate at the wheel-rotated faces 16 as described above. Due to the rubber crawler 10 (rubber belt 12) being trained around the drive wheel 100 and the idler wheel 102 under a specific tensile force, frictional force arises between the outer circumferential faces 100B of the drive wheel 100 and the wheel-rotated faces 16, transmitting drive force of the drive wheel 100 to the rubber crawler 10, and circulating the rubber crawler 10 between the drive wheel 100 and the idler wheel 102 such that the rubber crawler 10 travels.

As illustrated in FIG. 1 and FIG. 2, the outer periphery of the rubber belt 12 is formed with block shaped lugs 18 that project out toward the crawler circumferential outside and make contact with the ground. The lugs 18 are disposed in left and right pairs on either side of a center line CL, with plural of the lugs 18 formed at intervals around the crawler circumferential direction. The shape of the lugs 18 is not limited to that illustrated in FIG. 2, and may be any shape capable of gripping the ground when the rubber crawler 10 is traveling.

As illustrated in FIG. 3, an endless main cord layer 24 includes a main cord 20 extending around the crawler circumferential direction is incorporated within the rubber belt 12. The main cord layer 24 of the present exemplary embodiment is configured from winding a single rubber covered main cord 20 around the crawler circumferential direction in a spiral shape. The covering rubber covering the main cord 20 is omitted from illustration in FIG. 3 and FIG. 4, and in FIG. 5, the rubber covering of the main cord 20 is illustrated by double-dotted intermittent lines.

Figure 4:
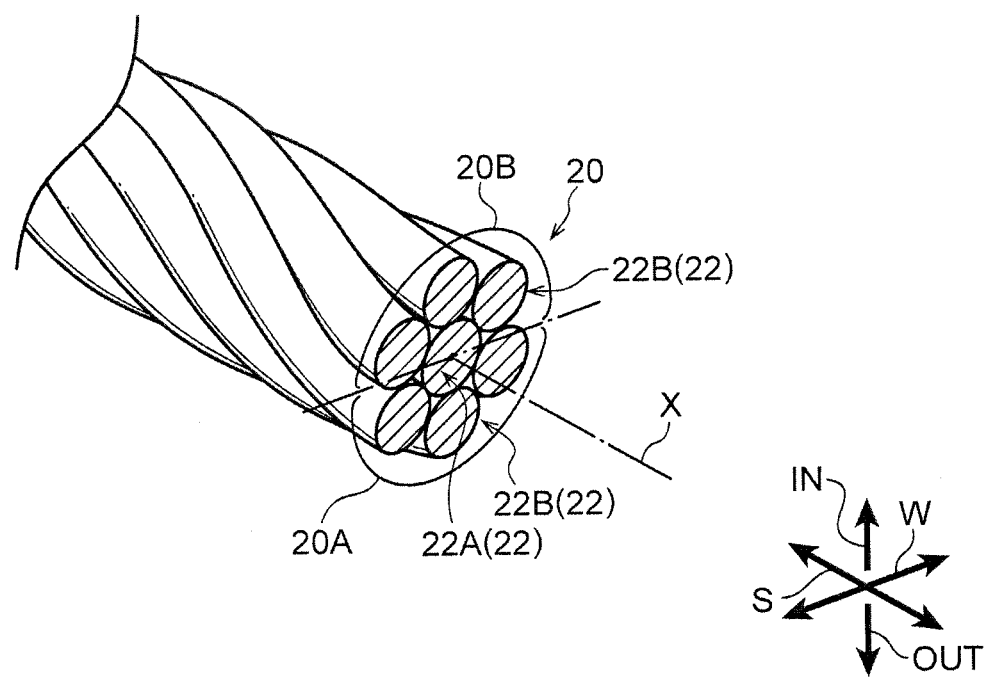
FIG. 4 is a perspective view illustrating main cord of the first exemplary embodiment.

As illustrated in FIG. 4, the main cord 20 is configured by twisting together plural strands 22. The main cord 20 of the present exemplary embodiment has a Z-twisted structure, namely is configured by Z-twisting the strands 22. Specifically, the main cord 20 is configured with a 1+6 twist structure (a structure of 6 sheath strands 22B twisted (wound) around the periphery of a single core strand 22A).

Figure 5:
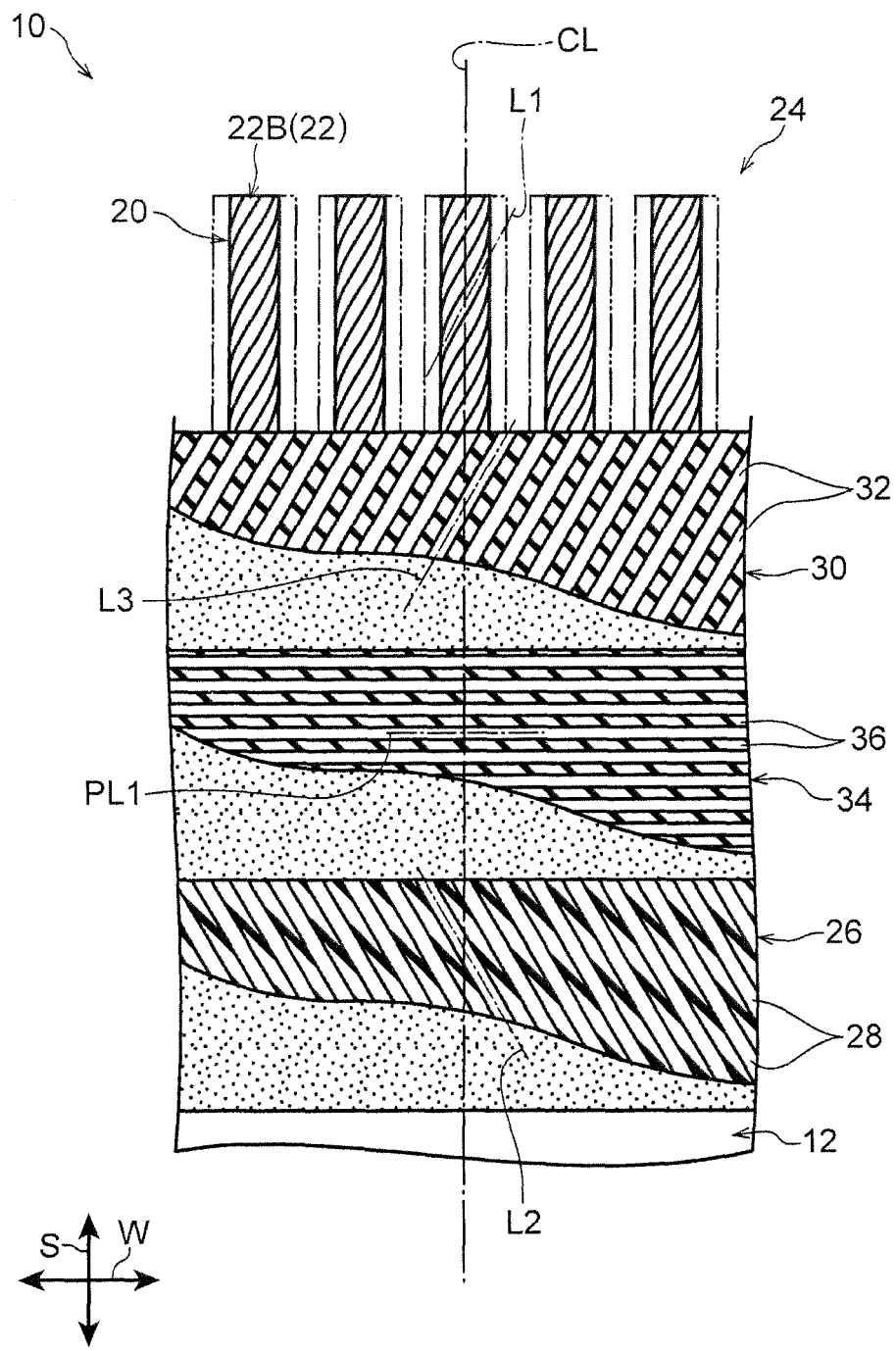
FIG. 5 is a partially cut away plan view of respective cord layers of the first exemplary embodiment, as viewed from the crawler circumferential outside.

Note that "Z-twisting" refers to twisting in which the extension direction (twisting direction) of the strands 22 (the sheath strands 22B in FIG. 5) is angled from top right to bottom left with respect to the axial center of the main cord 20 in plan view of the main cord 20, as illustrated in FIG. 5.

In the present exemplary embodiment, steel cord that exhibits excellent tensile strength is employed as the main cord 20, however the present invention is not limited thereto, and an organic fiber cord is configured from organic fibers (for example nylon fibers, aromatic polyamide fibers or the like) may be employed as the main cord 20 provided that there is sufficient tensile strength.

Although omitted from illustration in the drawings, each of the strands 22 of the present exemplary embodiment is configured from twisting together plural filaments.

As illustrated in FIG. 3, an endless belt shaped bias cord layer 26 (an example of a first bias cord layer of the present invention) is incorporated within the rubber belt 12 at the crawler circumferential outside of the main cord layer 24. The bias cord layer 26 is configured from plural bias cords 28 (an example of a first bias cord of the present invention) extending at an angle with respect to the crawler circumferential direction (in FIG. 5, extending at an angle from top left to bottom right (the angle direction indicated by the single-dotted intermittent line L2)), arranged side-by-side around the crawler circumferential direction, and embedded in belt shaped rubber.

As illustrated in FIG. 3, an endless belt shaped bias cord layer 30 (an example of a second bias cord layer of the present invention) is incorporated within the rubber belt 12 between the bias cord layer 26 and the main cord layer 24. The bias cord layer 30 is configured from plural bias cords 32 (an example of a second bias cord of the present invention) extending at an angle with respect to the crawler circumferential direction so as to intersect the bias cords 28 (in FIG. 5, extending at an angle from top right to bottom left (the angle direction indicated by the single-dotted intermittent line L3)), arranged side-by-side around the crawler circumferential direction and embedded in belt shaped rubber.

In the present exemplary embodiment, as illustrated in FIG. 5, the bias cords 28 and the bias cords 32 are angled in mutually opposing directions to each other with respect to the center line CL of the rubber belt 12. The crawler circumferential direction mentioned above is a direction parallel to the center line CL, and the crawler width direction is a direction orthogonal to the center line CL.

The bias cord layers 26, 30 are employed to protect the main cord layer 24 when the rubber crawler 10 rides over objects protruding from the ground contacted during travel, and to suppress cracks arising at the circumferential outside of the rubber crawler 10 from developing as far as the main cord layer 24. The tensile strength (pulling strength) of the bias cords 28, 32 is accordingly set lower than the tensile strength of the main cord 20 from the perspective of flexibility with respect to bending of the rubber crawler 10.

In the present exemplary embodiment, steel cord with a smaller diameter than the main cord 20 is employed for the bias cords 28, 32 from the perspective of flexibility with respect to bending of the rubber crawler 10, however the present invention is not limited to such a configuration, and an organic fiber cord is configured from organic fibers (for example nylon fibers, aromatic polyamide fibers or the like) may be employed for the bias cords 28 provided that there is sufficient tensile strength.

The main cord layer 24, the bias cord layer 26, and the bias cord layer 30 of the present exemplary embodiment are what are referred to as unidirectional fiber reinforcement materials (composite materials in which reinforcing fibers are arranged in a single direction), and so shear deformation occurs in response to tension in the crawler circumferential direction, as described later.

In the present exemplary embodiment, the angle of the bias cords 28 with respect to the center line CL is set at the same value as the angle of the bias cords 32 with respect to the center line CL.

The angle of the bias cords 28 with respect to the center line CL and the angle of the bias cords 32 with respect to the center line CL may have different values to each other provided that respective shear deformation of the main cord layer 24, the bias cord layer 26, and the bias cord layer 30 can be canceled out, as described later.

As illustrated in FIG. 3, an endless belt shaped reinforcement cord layer 34 is incorporated within the rubber belt 12 between the bias cord layer 26 and the bias cord layer 30. The reinforcement cord layer 34 is configured from plural reinforcement cords 36 extending in the crawler width direction, arranged side-by-side around the crawler circumferential direction and embedded in belt shaped rubber. As illustrated in FIG. 5, the reinforcement cords 36 extend in straight line shapes in a direction orthogonal to the center line CL (in a direction at an angle of 90 degrees to the center line CL) (in FIG. 5, the extension direction of the reinforcement cords 36 is indicated by the single-dotted intermittent line PL1). The reinforcement cord layer 34 accordingly has high rigidity in the crawler width direction, in other words, does not readily deform in the crawler width direction.

The angle of the reinforcement cords 36 with respect to the center line CL is set in a range of 90 degrees±3 degrees, including manufacturing tolerance. In the present exemplary embodiment, the reinforcement cords 36 extend in a straight line shape orthogonal to the center line CL in a state in which the rubber crawler 10 is not fitted to the wheels (namely, a state in which tension is not applied).

Steel cord is employed for the reinforcement cords 36 of the present exemplary embodiment in order to raise rigidity in the crawler width direction; however the present invention is not limited thereto, and an organic fiber cord configured from organic fibers (for example nylon fibers, aromatic polyamide fibers or the like) may be employed as the reinforcement cords 36 provided that there is sufficient rigidity in the crawler width direction.

As illustrated in FIG. 5, in the present exemplary embodiment, viewed from the crawler circumferential outside the bias cords 28 are angled with respect to the center line CL toward the opposite side to the angled side of the sheath strands 22B.

Specifically, the bias cords 28 are angled with respect to the center line CL (in FIG. 5, an angle from top left to bottom right (the angle direction indicated by the single-dotted intermittent line L2)). However, the sheath strands 22B of the main cord 20 that has a Z-twisted structure are angled with respect to the center line CL toward the opposite side to the angled side of the bias cords 28 (in FIG. 5, an angle from top right to bottom left (the angle direction indicated by the single-dotted intermittent line L1)).

Next, explanation follows regarding operation and advantageous effects of the rubber crawler 10 of the present exemplary embodiment.

In a portion of the rubber crawler 10 that is trained around the wheels (referred to below as the "trained portion C"), the main cord layer 24 bends and is pulled along the outer circumference of the wheels (the drive wheel 100 and the idler wheel 102 in FIG. 1) (is pulled in the crawler circumferential direction). In the trained portion C, the bias cord layer 26 and the bias cord layer 30 at the crawler circumferential outside of the main cord layer 24 are also bent and pulled around the outer circumference of the respective wheels.

When this occurs, shear deformation occurs accompanying tensile deformation in the bias cord layer 26 and the bias cord layer 30.

Note that since the bias cord layer 26 and the bias cord layer 30 undergo deformation so as to become narrower in width in the crawler width direction (namely Poisson contraction) accompanying the tensile deformation, the reinforcement cord layer 34 is configured from the reinforcement cords 36 extending in the crawler width direction is provided between the two bias cord layers 26, 30. This enables such deformation to become narrower in width (Poisson contraction) of the bias cord layer 26 and the bias cord layer 30 to be suppressed. As a result, tensile deformation of the respective bias cord layer 26 and bias cord layer 30 can be suppressed, and the shear deformation of the respective bias cord layer 26 and bias cord layer 30 accompanying the tensile deformation can be suppressed.

Lateral slippage of the rubber crawler 10 circulating between the wheels on which it is trained (the drive wheel 100 and the idler wheel 102 in the present exemplary embodiment) can accordingly be suppressed.

Due to the above, the rubber crawler 10 enables deformation (shear deformation) of each internally incorporated cord layer to be suppressed, and enables lateral slippage during travel to be suppressed.

Shear deformation between the respective bias cord layers 26, 30 is moreover suppressed by the reinforcement cord layer 34, thereby enabling the occurrence of cracks between the respective bias cord layers 26, 30 due to shear deformation to be suppressed, and enabling an increase in durability of the rubber crawler 10.

The reinforcement cord layer 34 also enhances the protective effect of the main cord layer 24.

In the rubber crawler 10, the shear deformation accompanying tensile deformation in the bias cord layer 26 and the shear deformation accompanying tensile deformation in the bias cord layer 30 mutually cancel each other out due to the bias cords 28 and the bias cords 32 being angled in mutually opposing directions to each other with respect to the center line CL. The advantageous effect of suppressing deformation in the respective internally incorporated bias cord layers 26, 30 is accordingly enhanced.

In the trained portion C of the rubber crawler 10, with reference to the axial center X (see FIG. 4), tension occurs in the main cord 20 at a portion 20A further to the crawler circumferential outside than the axial center X, and compression occurs in the main cord 20 at a portion 20B further to the crawler circumferential inside than the axial center X.

Viewed from the crawler circumferential outside as in FIG. 5, the sheath strands 22B configuring the main cord 20 are angled (angled from top right to bottom left in FIG. 5) along the twisting direction (Z twisting in the present exemplary embodiment) with respect to the center line CL. The crawler circumferential outside of the main cord layer 24 accordingly functions as a cord layer in which the cord is angled with respect to the crawler circumferential direction in one direction, and the crawler circumferential inside of the main cord layer 24 functions as a cord layer in which the cord is angled with respect to the crawler circumferential direction in the opposite direction to the crawler circumferential outside of the main cord layer 24.

A pseudo-cord layer is configured from the crawler circumferential inside of the main cord layer 24 configures a compressed side during the bending mentioned above, thereby undergoing similar shear deformation to a pseudo-cord layer is configured from the crawler circumferential outside of the main cord layer 24.

In the trained portion C of the rubber crawler 10, the main cord layer 24 configures a bend neutral plane (neutral axis), such that tension arises in the bias cord layers 26, 30. In particular, out of the bias cord layers 26, 30, the crawler circumferential outside bias cord layer 26 is the further away from the bend neutral plane, and is thereby subject to larger tensile force and undergoes greater shear deformation.

Note that, as viewed from the crawler circumferential outside, the bias cords 28 of the crawler circumferential outside bias cord layer 26 are angled toward the opposite side to the angled side of the sheath strands 22B of the main cord 20 with respect to the center line CL. The shear deformation of the main cord layer 24 and the shear deformation of the bias cord layer 26 accordingly cancel each other out, thereby suppressing deformation of the rubber crawler 10.

Second Exemplary Embodiment

Figure 6:
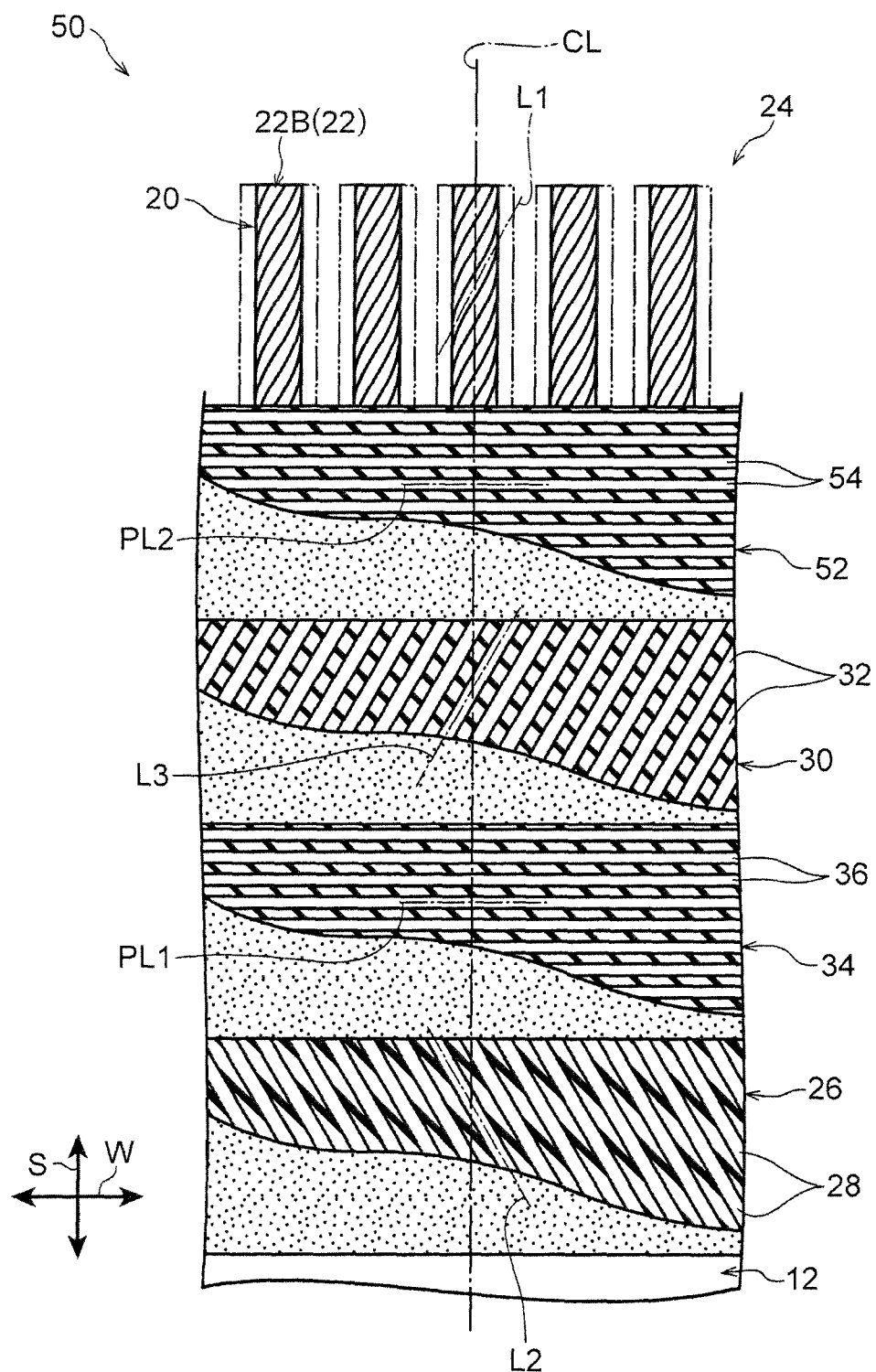
FIG. 6 is a partially cut away plan view of respective cord layers in a rubber crawler of a second exemplary embodiment, as viewed from the crawler circumferential outside.

Explanation follows regarding a rubber crawler of a second exemplary embodiment of the present invention, with reference to FIG. 6. Note that configurations similar to the first exemplary embodiment are allocated the same reference numerals, and explanation thereof is omitted.

As illustrated in FIG. 6, a rubber crawler 50 of the present exemplary embodiment is provided with a reinforcement cord layer 52 between the bias cord layer 30 and the main cord layer 24, and is otherwise of similar configuration to the rubber crawler 10 of the first exemplary embodiment. Explanation accordingly follows regarding configuration of the reinforcement cord layer 52.

As illustrated in FIG. 6, in the rubber crawler 50, the reinforcement cord layer 52 is provided between the bias cord layer 30 and the main cord layer 24. The reinforcement cord layer 52 is configured from plural reinforcement cords 54 extending in the crawler width direction, arranged side-by-side around the crawler circumferential direction and embedded in belt shaped rubber. As illustrated in FIG. 6, the reinforcement cords 54 extend in straight line shapes in a direction orthogonal to the center line CL (the extension direction indicated by the single-dotted intermittent line PL2). The reinforcement cord layer 52 accordingly has high rigidity in the crawler width direction.

Similar steel cord to that of the reinforcement cords 36 is employed for the reinforcement cords 54 of the present exemplary embodiment in order to raise the crawler width direction rigidity of the reinforcement cord layer 52; however the present invention is not limited thereto, and an organic fiber cord is configured from organic fibers (for example nylon fibers, aromatic polyamide fibers or the like) may be employed provided that there is sufficient rigidity in the crawler width direction. Alternatively, the reinforcement cords 54 and the reinforcement cords 36 may be configured with different materials and/or diameters to each other.

Explanation follows regarding operation and advantageous effects of the rubber crawler 50 of the second exemplary embodiment.

Note that out of the operation and advantageous effects of the present exemplary embodiment, explanation regarding operation and advantageous effects similar to those of the first exemplary embodiment is omitted as appropriate.

In the rubber crawler 50, the reinforcement cord layer 52 is provided between the bias cord layer 30 and the main cord layer 24. The bias cord layer 30 is accordingly interposed between the reinforcement cord layer 34 and the reinforcement cord layer 52, thereby effectively suppressing deformation to become narrower in width (Poisson contraction) accompanying tensile deformation in the bias cord layer 30. Shear deformation accompanying tensile deformation in the bias cord layer 30 is also effectively suppressed as a result. Moreover, shear deformation of the main cord layer 24 is also suppressed due to providing the reinforcement cord layer 52 adjacent to the main cord layer 24.

The reinforcement cord layer 52 also enhances the advantageous effect of protecting the main cord layer 24.

Third Exemplary Embodiment

Figure 7:
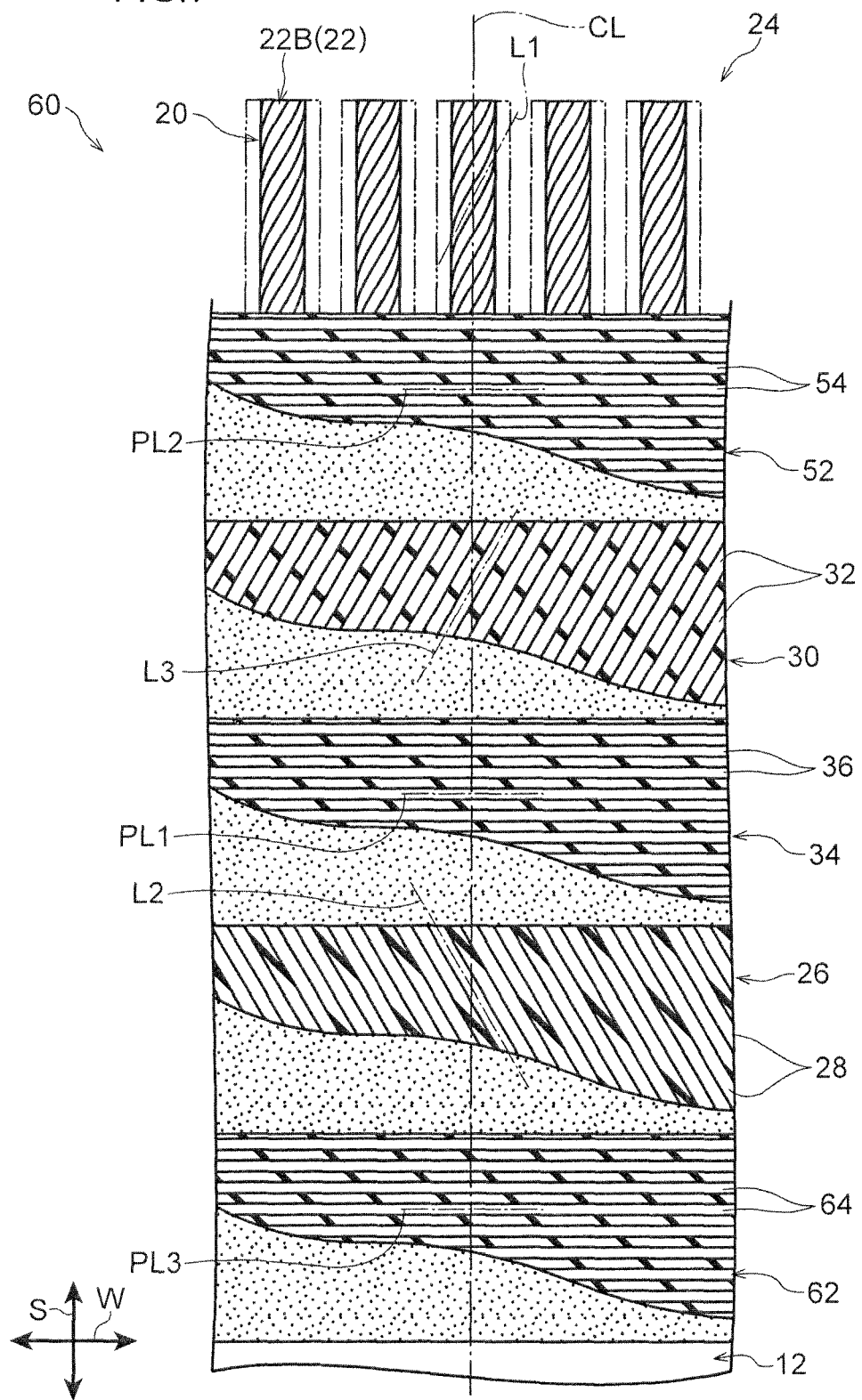
FIG. 7 is a partially cut away plan view of respective cord layers in a rubber crawler of a third exemplary embodiment, as viewed from the crawler circumferential outside.

Next, explanation follows regarding a rubber crawler of a third exemplary embodiment of the present invention, with reference to FIG. 7. Note that configurations similar to the second exemplary embodiment are allocated the same reference numerals, and explanation thereof is omitted.

As illustrated in FIG. 7, a rubber crawler 60 of the present exemplary embodiment is provided with a reinforcement cord layer 62 at the crawler circumferential outside of the bias cord layer 26, and is otherwise similar to the rubber crawler 50 of the second exemplary embodiment. Explanation accordingly follows regarding configuration of the reinforcement cord layer 62.

As illustrated in FIG. 7, in the rubber crawler 60 the reinforcement cord layer 62 is incorporated within the rubber belt 12 at the crawler circumferential outside of the bias cord layer 26. The reinforcement cord layer 62 is configured from plural reinforcement cords 64 extending in the crawler width direction, arranged side-by-side around the crawler circumferential direction and embedded in belt shaped rubber. As illustrated in FIG. 7, the reinforcement cords 64 extend in straight line shapes in a direction orthogonal to the center line CL (the extension direction indicated by the single-dotted intermittent line PL3). The reinforcement cord layer 62 accordingly has high rigidity in the crawler width direction.

Similar steel cord to that of the reinforcement cords 36 is employed for the reinforcement cords 64 of the present exemplary embodiment in order to raise the crawler width direction rigidity of the reinforcement cord layer 62; however the present invention is not limited thereto, and an organic fiber cord is configured from organic fibers (for example nylon fibers, aromatic polyamide fibers or the like) may be employed provided that there is sufficient rigidity in the crawler width direction. Alternatively, the reinforcement cords 64 and the reinforcement cords 36 may be configured with different materials and/or diameters to each other.

Explanation follows regarding operation and advantageous effects of the rubber crawler 60 of the third exemplary embodiment.

Note that out of the operation and advantageous effects of the present exemplary embodiment, explanation regarding operation and advantageous effects similar to those of the second exemplary embodiment is omitted as appropriate.

In the rubber crawler 60, the reinforcement cord layer 62 is provided adjacent to the bias cord layer 26 on the crawler circumferential outside. The bias cord layer 26 is accordingly interposed between the reinforcement cord layer 34 and the reinforcement cord layer 62, thereby effectively suppressing deformation to become narrower in width (Poisson contraction) accompanying tensile deformation in the bias cord layer 26. Shear deformation accompanying tensile deformation in the bias cord layer 30 is also effectively suppressed as a result. The reinforcement cord layers 34, 52, 62 effectively suppress shear deformation in the main cord layer 24, the bias cord layer 26, and the bias cord layer 30 respectively.

In the rubber crawler 10, 50, 60 of the first to third exemplary embodiments, the strands 22 are Z-twisted to configure the main cord 20, and the main cord layer 24 is configured from the main cord 20; however the present invention is not limited thereto, and the strands 22 may be S-twisted to configure the main cord 20, and the main cord layer 24 is configured from the main cord 20. In such cases, as viewed from the crawler circumferential outside, the angle directions with respect to the center line CL of the bias cords 28, 32 of the respective bias cord layers 26, 30 are preferably reversed. Namely, the angle of the bias cords 32 with respect to the center line CL is preferably the reverse of the angle of the strands 22 (sheath strands 22B) with respect to the center line CL. Note that "S-twisting" is twisting in the opposite direction to Z-twisting.

In the first to third exemplary embodiments, the main cord layer 24 is configured by winding a single rubber covered main cord 20 in a spiral shape, however the present invention is not limited to such a configuration, and a belt shaped body may be formed by embedding plural main cords 20 extending around the crawler width direction, and arranged side-by-side in the crawler width direction, in belt shaped rubber, and an endless belt shaped main cord layer 24 may be configured by superimposing and joining together both ends of the belt shaped body. Note that in such a configuration, the main cord 20 may be disposed in a straight line shape along the crawler circumferential direction.

In the first to the third exemplary embodiments, the rubber crawler has a structure in which there is no internal metal core disposed at portions driven by frictional force between the rubber belt 12 and the wheels (the drive wheel 100);

however the present invention is not limited to such a configuration, and a metal core may be incorporated inside the rubber crawler.

In the first to the third exemplary embodiments, the rubber crawler has a structure driven by frictional force between the rubber belt 12 and the wheels (the drive wheel 100); however the present invention is not limited to such a configuration, and the rubber crawler may have a structure in which plural pins spanning around the outer circumferential edge portions of the wheel portions 100A of the drive wheel 100 push against the rubber projections 14 to transmit drive force from the drive wheel 100 to the rubber belt 12 (rubber crawler).

The first to the third exemplary embodiments employ the rubber belt 12 formed from rubber material in an endless shape as an example of an endless rubber body; however the present invention is not limited to such a configuration, and a rubber-elastic body belt configured from a material with rubber-like elasticity formed into an endless shape, such as an elastomer belt configured by forming an elastomer that is a resin material with rubber-like elasticity into an endless shape, may be employed as an example of the endless rubber body.

Exemplary embodiments have been described in the above explanation of the present invention, however these exemplary embodiments are merely examples, and various modifications may be implemented within a range not departing from the spirit of the present invention. It goes without saying that the scope of rights of the present invention is not limited by these exemplary embodiments.

Test Example

In order to verify the advantageous effects of the present invention, an Example rubber crawler of the present invention, and a Comparative Example rubber crawler not included in the present invention were tested as follows. The sample rubber crawlers employed during testing were the same size as each other.

Sample Rubber Crawlers

Example: a rubber crawler with the structure of the rubber crawler of the first exemplary embodiment.

Comparative Example: a rubber crawler that is the rubber crawler of the first exemplary embodiment with a structure in which, rather than providing the reinforcement cord layer 34 between the bias cord layer 26 and the bias cord layer 30, the reinforcement cord layer 34 is provided at the crawler circumferential outside of the bias cord layer 26.

Test Method

Figure 8:
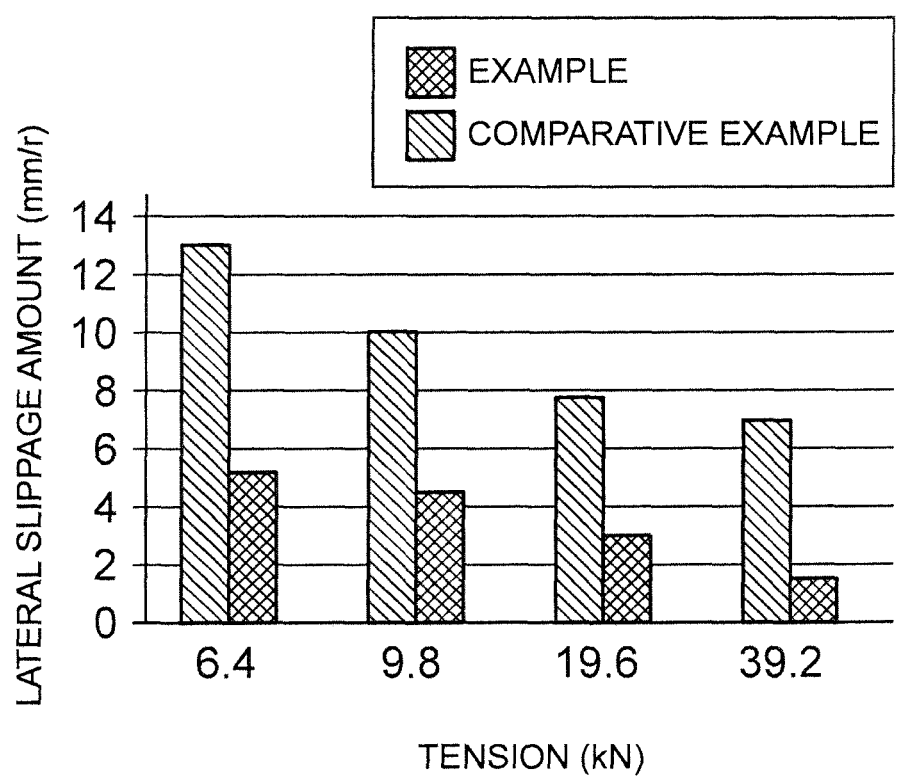
FIG. 8 is a graph illustrating a relationship between tension imparted to a rubber crawler, and lateral slippage amount of the rubber crawler over one lap between a drive wheel and a following wheel.

The sample rubber crawlers were trained around a drive wheel and a following wheel of a test device and circulated one lap between the drive wheel and the following wheel in a state applied with a specific tensile force (tension), and the lateral slippage amount (movement amount) of the rubber crawlers was measured. The test results are illustrated in FIG. 8. Note that for the lateral slippage amount of the rubber crawlers, the lower the value, the better the result.

As illustrated in FIG. 8, when the sample rubber crawlers were circulated one lap while applying different tensions to the sample rubber crawlers, the values for the Example were lower than the values for the Comparative Example for lateral slippage amount. Namely, the rubber crawler of the Example suppresses deformation of each internally incorporated cord layer, and suppresses lateral slippage during travel.

The invention claimed is:

1. A rubber crawler comprising:
   an endless rubber body that is trained around a plurality of wheels;
   a main cord layer that is incorporated within the rubber body and includes a main cord extending around a rubber body circumferential direction;
   a first bias cord layer that is incorporated within the rubber body further to a rubber body circumferential outside than the main cord layer and is configured from first bias cords arranged side-by-side around the rubber body circumferential direction, the first bias cords extending at an angle with respect to the rubber body circumferential direction;
   a second bias cord layer that is interposed between the first bias cord layer and the main cord layer, and is configured from second bias cords arranged side-by-side around the rubber body circumferential direction and extending at an angle with respect to the rubber body circumferential direction so as to intersect the first bias cords; and
   a first reinforcement cord layer that is interposed between the first bias cord layer and the second bias cord layer, and is configured from reinforcement cords extending in a rubber body width direction, the reinforcement cords arranged side-by-side around the rubber body circumferential direction,
   wherein a second reinforcement cord layer is interposed between the second bias cord layer and the main cord layer.

2. The rubber crawler of claim 1, wherein a third reinforcement cord layer is incorporated at a rubber body circumferential outside of the first bias cord layer.

3. The rubber crawler of claim 1, wherein the first bias cords and the second bias cords are angled in mutually opposing directions from each other with respect to the rubber body circumferential direction.

* * * * *